United States Patent
Okamoto

(10) Patent No.: US 9,083,825 B2
(45) Date of Patent: Jul. 14, 2015

(54) COMMUNICATION SYSTEM, COMMUNICATION METHOD, INFORMATION PROCESSING APPARATUS, AND STORAGE MEDIUM

(71) Applicant: Takuya Okamoto, Kanagawa (JP)

(72) Inventor: Takuya Okamoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/485,036

(22) Filed: Sep. 12, 2014

(65) Prior Publication Data

US 2015/0077813 A1    Mar. 19, 2015

(30) Foreign Application Priority Data

Sep. 17, 2013   (JP) .................. 2013-192426

(51) Int. Cl.
| | |
|---|---|
| *G06F 15/00* | (2006.01) |
| *G06F 3/12* | (2006.01) |
| *G06K 1/00* | (2006.01) |
| *H04N 1/00* | (2006.01) |

(52) U.S. Cl.
CPC ....... *H04N 1/00114* (2013.01); *H04N 1/00209* (2013.01); *H04N 2201/0093* (2013.01); *H04N 2201/0094* (2013.01)

(58) Field of Classification Search
CPC .. G06F 3/1296; G06K 15/00; H04N 1/00114; H04N 1/00209
USPC .................. 358/1.15, 1.14, 1.1, 438
See application file for complete search history.

(56) References Cited

U.S. PATENT DOCUMENTS

| | | | |
|---|---|---|---|
| 2014/0095362 A1* | 4/2014 | Friedholm et al. | 705/34 |
| 2014/0253942 A1* | 9/2014 | Selvaraj et al. | 358/1.14 |

FOREIGN PATENT DOCUMENTS

JP    2009-290730    12/2009

* cited by examiner

*Primary Examiner* — Douglas Tran
(74) *Attorney, Agent, or Firm* — Oblon, McClelland, Maier & Neustadt, L.L.P.

(57) ABSTRACT

A communication system for one or more communication apparatuses communicable with an external apparatus includes a storing unit to store data received by a communication apparatus from the external apparatus used as a transmission sender of the received data, and transmission/reception information including information of the external apparatus as transmission sender information and identification information of the communication apparatus used for receiving the received data; an identification unit to identify received data, selected by a user, from the received data stored in the storing unit; a transmission data obtaining unit to obtain transmission data to be transmitted to the external apparatus; and a transmission control unit to transmit the transmission data to the external apparatus from the communication apparatus that has received the selected received data among the one or more communication apparatuses based on the transmission/reception information stored in the storing unit.

17 Claims, 13 Drawing Sheets

FIG. 9
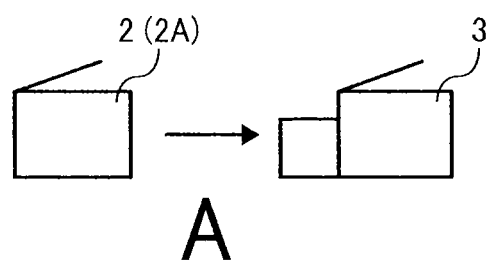
A
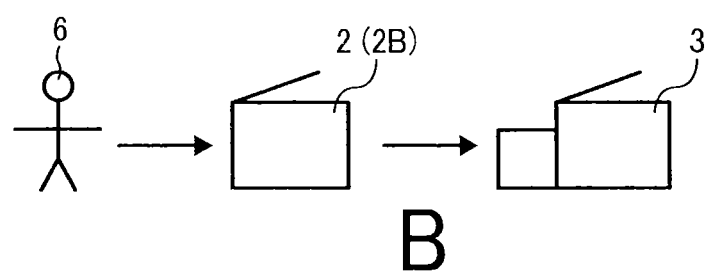
B
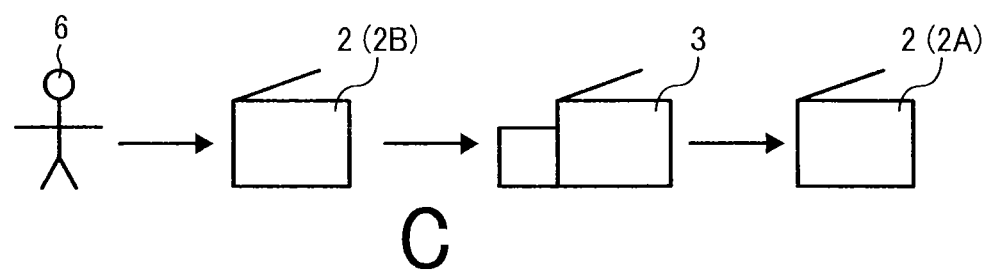
C

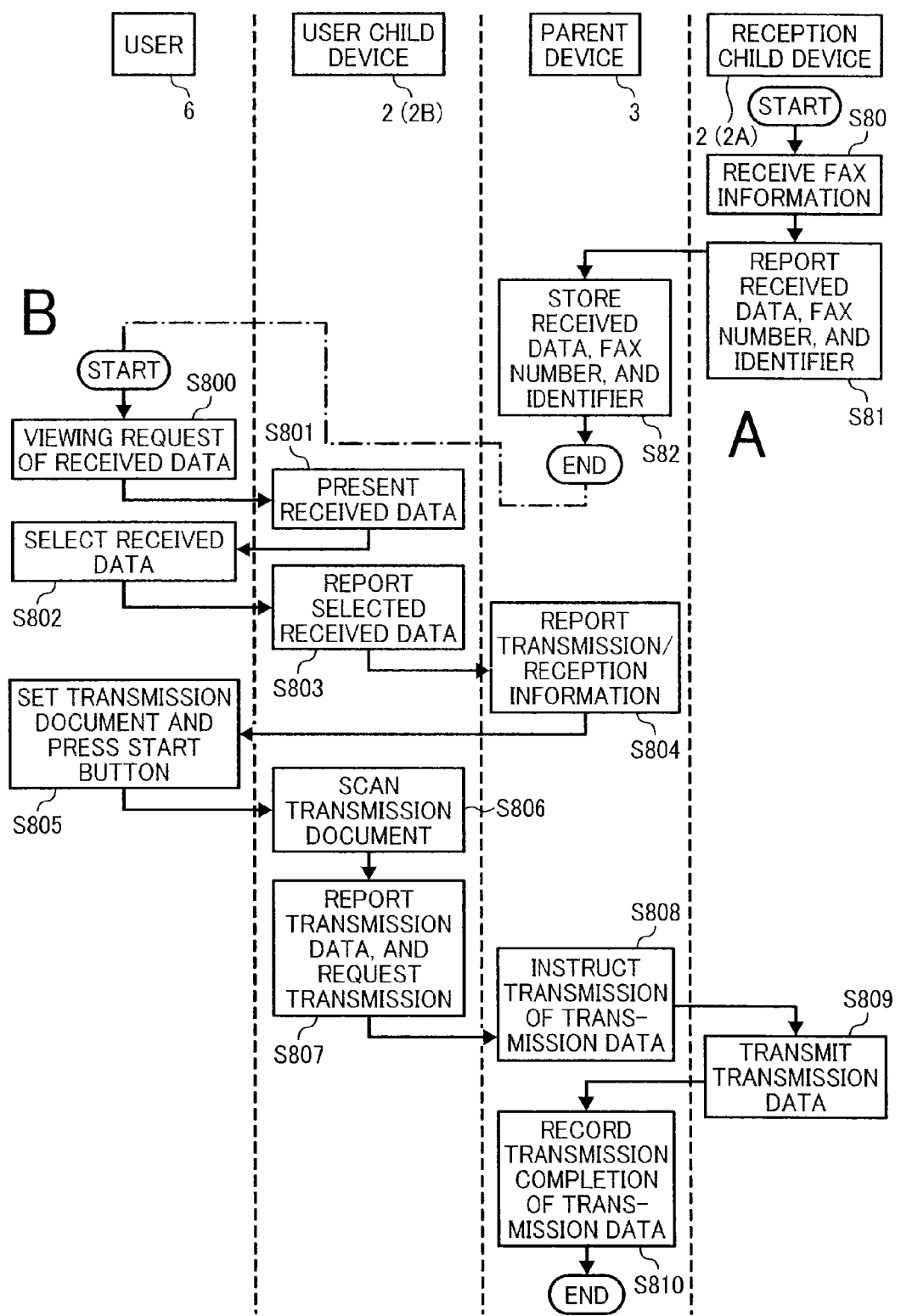

COMMUNICATION SYSTEM, COMMUNICATION METHOD, INFORMATION PROCESSING APPARATUS, AND STORAGE MEDIUM

This application claims priority pursuant to 35 U.S.C. §119 (a) to Japanese Patent Application No. 2013-192426, filed on Sep. 17, 2013 in the Japan Patent Office, the disclosures of which are incorporated by reference herein in their entirety.

BACKGROUND

1. Technical Field

The present invention relates to a communication system for communication between an external apparatus and a communication apparatus, a communication method, an information processing apparatus, and a storage medium storing program.

2. Background Art

As to communication apparatuses such as facsimile machines, a communication system can be configured with a plurality of communication apparatuses, in which data received from an external apparatus by the communication apparatus is stored in a storing unit of the communication system. Further, the communication system can be configured with a server that stores data such as image data received by a facsimile machine, and also a facsimile number of a transmission sender of the image data.

Conventional servers store image data and facsimile number in a given storing unit based on the facsimile number, and manages the image data. The image data and facsimile number stored in the server can be used for various purposes by a user. For example, the facsimile number can be used to transmit a response to a transmission sender of the image data.

When one facsimile machine transmits image data, the image data and the facsimile number of the one facsimile machine (i.e., transmission sender) is reported to a facsimile apparatus used as a transmission destination. For example, the facsimile machine apparatus that has received the image data identifies the facsimile machine used as the transmission sender of the image data based on the facsimile number of the transmission sender, or conducts a pre-set process. Therefore, it is desired to transmit image data from the facsimile machine used as the transmission destination in the previous communication that received the image data from the one facsimile machine used as the transmission sender. In this configuration, the facsimile number of the transmission sender can be registered as a facsimile number to the facsimile machine used as the transmission destination, in which the facsimile number used in the previous communication by the facsimile machine (i.e., transmission destination) corresponds to the facsimile number of the transmission sender.

In conventional servers, a user needs to check image data and facsimile number stored in the server to determine a facsimile machine to be used for transmission of image data. Then, a user moves to the facsimile machine determined to be used for transmission of image data, and transmits the image data to a facsimile machine to be used as transmission destination using the determined facsimile machine. Therefore, as to conventional servers, when transmitting image data using a facsimile machine that received image data in the previous communication, a greater load is required by the user, and transmission of image data becomes time-consuming process.

SUMMARY

In one aspect of the present invention, a communication system for one or more communication apparatuses communicable with an external apparatus is devised. The communication system includes a storing unit to store data received by a communication apparatus from the external apparatus used as a transmission sender of the received data, and transmission/reception information including information of the external apparatus as transmission sender information and identification information of the communication apparatus used for receiving the received data; an identification unit to identify received data, selected by a user, from the received data stored in the storing unit; a transmission data obtaining unit to obtain transmission data to be transmitted to the external apparatus, which is the transmission sender of the selected received data identified by the identification unit; and a transmission control unit to transmit the transmission data to the external apparatus, which is the transmission sender of the selected received data, from the communication apparatus that has received the selected received data among the one or more communication apparatuses based on the transmission/reception information stored in the storing unit.

In another aspect of the present invention, a communication method of controlling communication of one or more communication apparatuses with an external apparatus is devised. The method includes storing, in a memory, data received by a communication apparatus from the external apparatus, and transmission/reception information including transmission sender information of the external apparatus indicating a transmission sender of the received data, and identification information of the communication apparatus used for receiving the received data, the communication apparatus being one or more of the communication apparatuses; identifying selected received data selectable by a user from the received data stored in the memory; obtaining transmission data to be transmitted to the external apparatus, which is the transmission sender of the selected received data; and transmitting the transmission data to the external apparatus, which is the transmission sender of the selected received data, from the communication apparatus that has received the selected received data among the one or more communication apparatuses based on the transmission/reception information stored in the memory.

In another aspect of the present invention, an information processing apparatus is devised. The information processing apparatus includes a storing unit to store data received by a communication apparatus from an external apparatus, and transmission/reception information including transmission sender information of the external apparatus indicating a transmission sender of the received data, and identification information of the communication apparatus used for receiving the received data, the communication apparatus being one or more communication apparatuses communicable with the external apparatus; an identification unit to identify selected received data selectable by a user from the received data stored in the storing unit; a transmission data obtaining unit to obtain transmission data to be transmitted to the external apparatus, which is the transmission sender of the selected received data identified by the identification unit; and a transmission control unit to transmit the transmission data to the external apparatus, which is the transmission sender of the selected received data, from the communication apparatus that has received the selected received data among the one or more communication apparatuses based on the transmission/reception information stored in the storing unit.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 9 is a communication situation in a communication system of the first example embodiment;

FIG. 15 is a flowchart showing the steps of a communication flow by a communication system of a seventh example embodiment.

Figure 1:
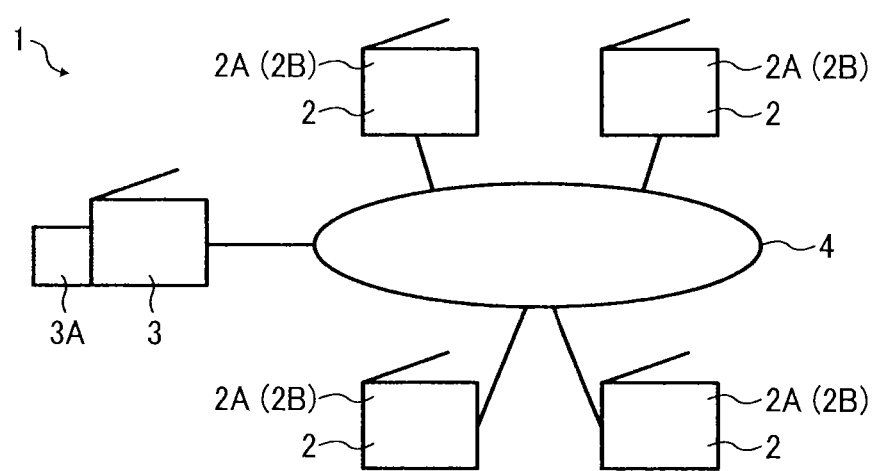
FIG. 1 is a configuration of a communication system of a first example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that have a similar function, operate in a similar manner, and achieve a similar result. Referring now to the drawings, an apparatus or system according to an example embodiment is described hereinafter.

Referring now to the drawings, a description is given of a communication system, a communication method, and an information processing apparatus. A communication system according to an example embodiment includes, for example, one or more communication apparatuses and an information processing apparatus. The communication apparatus communicates with an external apparatus such as an external communication apparatus having a communication unit. The communication apparatus can be various apparatuses having a communication unit that transmits and receives data with the external apparatus for communication such as facsimile apparatus, image forming apparatus having facsimile function, or the like. The information processing apparatus is a communication management apparatus that communicates with the communication apparatuses and manages communication of the communication apparatuses, wherein the information processing apparatus is, for example, a server, a personal computer, or an image forming apparatus having a server function. In the following description, a communication system including a plurality of communication apparatuses that can conduct facsimile communication with an external apparatus, and one information processing apparatus is described with reference to a plurality of example embodiments.

(First Example Embodiment)

FIG. 1 is a configuration of a communication system 1 according to a first example embodiment. As illustrated in FIG. 1, the communication system 1 includes, for example, a plurality of multi-function peripherals (MFPs) (hereinafter, child device 2) and one MFP used as a server MFP (hereinafter, parent device 3) having a server function. The MFP is a multi-functional apparatus having a plurality of functions such as facsimile function, printer function, copier function, and scanner function. The MFP can be connected to a network 4 for communication via the network 4. The child device 2 is one example of the communication apparatus, and can use a facsimile function to communicate with a plurality of external apparatuses having facsimile function to transmit and receive document image such as image data. The parent device 3 is one example of the information processing apparatus, and includes, for example, an information processing unit 3A.

The child device 2 receives image data from the external apparatus and also obtains facsimile number (i.e., FAX number) of the external apparatus from the external apparatus that transmits the image data, in which the external apparatus can be referred to as a sender or source of transmission (hereinafter, referred to as transmission sender)

Then, the child device 2 reports image data received from the external apparatus (i.e., received data) and given bibliographic information to the parent device 3, and the parent device 3 stores the received data and the bibliographic information. The bibliographic information is composed of, for example, FAX number of external apparatus (i.e., FAX number of transmission sender) indicating a transmission sender of received data, the identifier of the child device 2 that has received data, receiving date of received data, file number of received data, and page numbers of received data.

When the bibliographic information is reported, the parent device 3 obtains transmission/reception information of the received data composed of at least the FAX number of external apparatus and the identifier of the child device 2, and stores the received data and the transmission/reception information by correlating the received data and the transmission/reception information.

When image data used for transmission (i.e., transmission data) is to be transmitted to the external apparatus (i.e., transmission sender), which sent the received data, as a response to the received data, a user uses one child device 2 to request the parent device 3 to transmit the transmission data. Then, the parent device 3 determines one child device 2 to be used for transmission of the transmission data based on the transmission/reception information, in which the parent device 3 obtains the identifier of the child device 2 from the transmission/reception information correlated to the received data to determine the one child device 2 to be used for transmission of transmission data, and obtains the FAX number of the external apparatus, to which the transmission data is to be transmitted. Then, the parent device 3 controls communication of the communication system 1 to transmit the transmission data to the external apparatus having the obtained FAX number by using the one child device 2 having the obtained identifier. With this configuration, the transmission data can be transmitted to the external apparatus, which is the transmission sender of the received data, by using the child device 2 that has received the received data.

Further, as to the communication system 1, the received data is received image data, and the transmission data is transmission image data, FAX number of the external apparatus is an example of transmission sender information of the external apparatus indicating a transmission sender of the received data, and the identifier of the child device 2 is an example of identification information of the child device 2 that has received the received data. The FAX number of the external apparatus is FAX number or called subscriber identification (CSI) of the external apparatus, which is used by the external apparatus on a communication line connected to the external apparatus. Further, the identifier of the child device 2 is, for example, internet protocol (IP) address of the child device 2.

A description is given of the communication system 1 and a communication flow by the communication system 1. Each one of a plurality of the child devices 2 has the same configuration, and can conduct the same function in the communication system 1. Therefore, all of the child devices 2 can receive the received data, and a user can use any one of the child devices 2 to request transmission of transmission data to the parent device 3. In this description, for the simplicity of the decryption, a child device 2 that has received the received data is referred to as a "reception child device 2A," and a child device 2 to be used by a user is referred to as a "user child device 2B."

Figure 2:
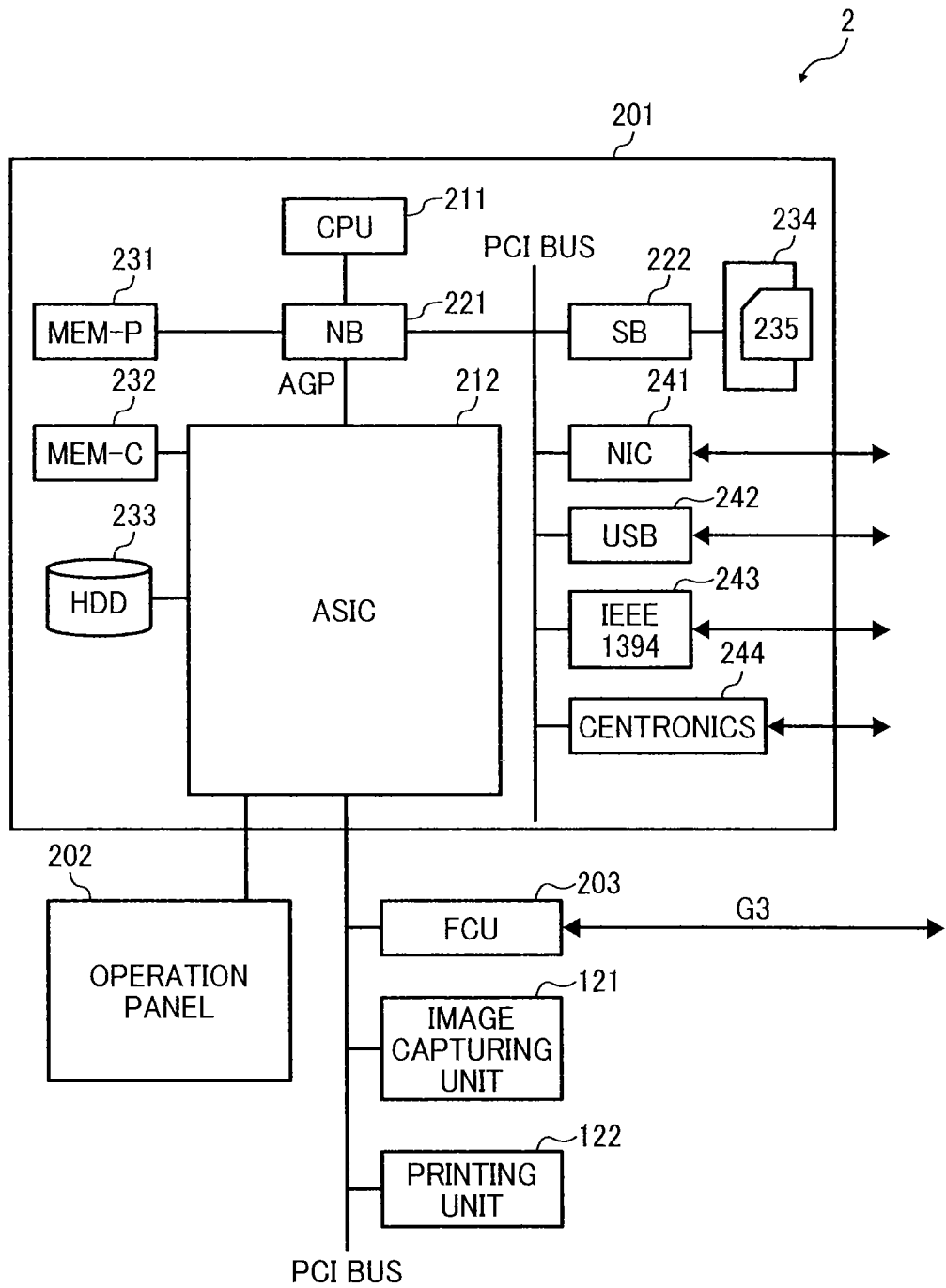
FIG. 2 is a block diagram of a hardware configuration of a child device of a first example embodiment.

FIG. 2 is a block diagram of a hardware configuration of the child device 2 of the first example embodiment. As illustrated in FIG. 2, the child device 2 includes, for example, an image capturing unit 121, a printing unit 122, a controller 201, an operation panel 202, and a facsimile control unit (FCU) 203. The image capturing unit 121 scans document to obtain image data. The printing unit 122 prints an image on a sheet based on the image data.

In the controller 201, a central processing unit (CPU) 211 conducts various information processing. An application specific integrated circuit (ASIC) 212 conducts various image processing. A NB 221 is a north bridge of the controller 201. A SB 222 is a south bridge of the controller 201. A MEM-P 231 is a system memory of the child device 2. A MEM-C 232 is a local memory of the child device 2. A hard disk drive (HDD) 233 is a storing unit of the child device 2. A memory card slot 234 is a slot to set a memory card 235. A network interface controller (NIC) 241 is a network communication controller using media access control (MAC) address. A universal serial bus (USB) device 242 is connectable to a USB standard connection terminal. An Institute of Electrical and Electronics Engineers (IEEE) 1394 device 243 is connectable to an IEEE 1394 standard connection terminal. A centronics device 244 is connectable to a centronics-specified connection terminal The operation panel 202 of the child device 2 has an operation unit used by a user for operating the child device 2, and a display unit to display various screens based on a user's operation. Further, as described below, the child device 2 includes a plurality of functionalities devisable by executing programs by the CPU 211.

Figure 3:
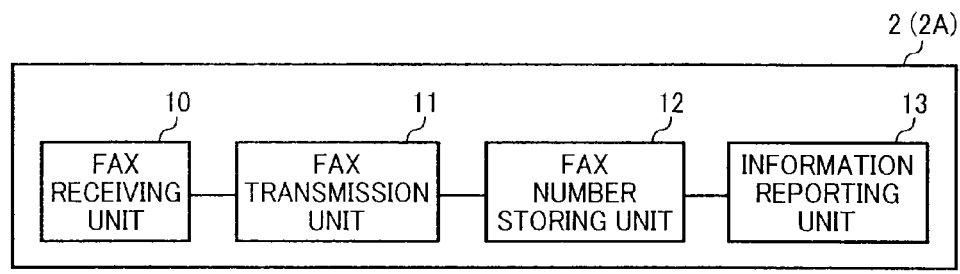
FIG. 3 is a functional block diagram of a child device of a first example embodiment.

FIG. 3 is a functional block diagram of the child device 2 of the first example embodiment, which illustrates a plurality of functions of the child device 2 used as the reception child device 2A. As illustrated in FIG. 3, the child device 2 used as the reception child device 2A includes, for example, a FAX receiving unit 10, a FAX transmission unit 11, a FAX number storing unit 12, and an information reporting unit 13. The FAX receiving unit 10 receives facsimile information (hereinafter, FAX information) from an external apparatus, and obtains received data (hereinafter, received image data) and FAX number of the external apparatus indicating a transmission sender of the received data included in FAX information.

When instructed to transmit transmission data (hereinafter, transmission image data) from the parent device 3, the FAX transmission unit 11 transmits the transmission data reported from the parent device 3 to the external apparatus using the FAX number reported from the parent device 3. The FAX number storing unit 12 stores the FAX number of the external apparatus indicating a transmission sender of the received data obtained by the FAX receiving unit 10. The information reporting unit 13 reports transmission/reception information including the received data obtained or received by the FAX receiving unit 10, the FAX number of the external apparatus indicating a transmission sender of the received data, and the identifier of the child device 2 itself to the parent device 3.

Figure 4:
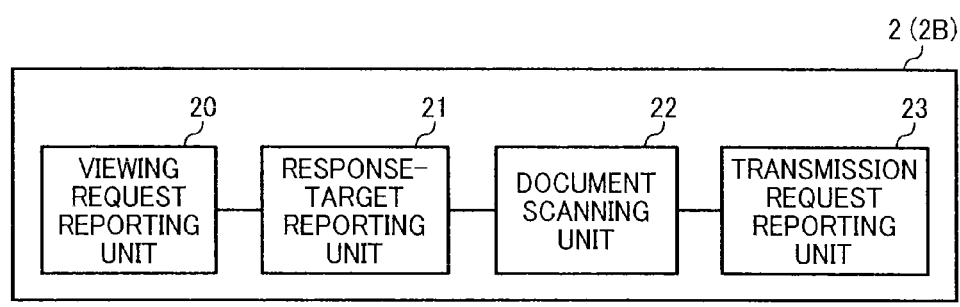
FIG. 4 is a functional block diagram of a child device of a first example embodiment.

FIG. 4 is a functional block diagram of the child device 2 of the first example embodiment, which shows a plurality of functions of the child device 2 used as the user child device 2B. As illustrated in FIG. 4, the child device 2 used as the user child device 2B includes, for example, a viewing request reporting unit 20, a response-target reporting unit 21, a document scanning unit 22, and a transmission request reporting unit 23. Based on a viewing request by a user, the viewing request reporting unit 20 reports the viewing request of the received data stored in the parent device 3 to the parent device 3.

Based on a user's selection, the response-target reporting unit 21 identifies the received data selected by a user (selected received data) from the received data stored in the parent device 3, and reports the selected received data as the received data of the response-target to the parent device 3. The document scanning unit 22 uses the image capturing unit 121 to scan transmission document set by a user to read the transmission document. Based on a transmission request by a user, the transmission request reporting unit 23 reports transmission data obtained by the document scanning unit 22 to the parent device 3, and reports a transmission request of the transmission data to an external apparatus to the parent device 3.

Figure 5:
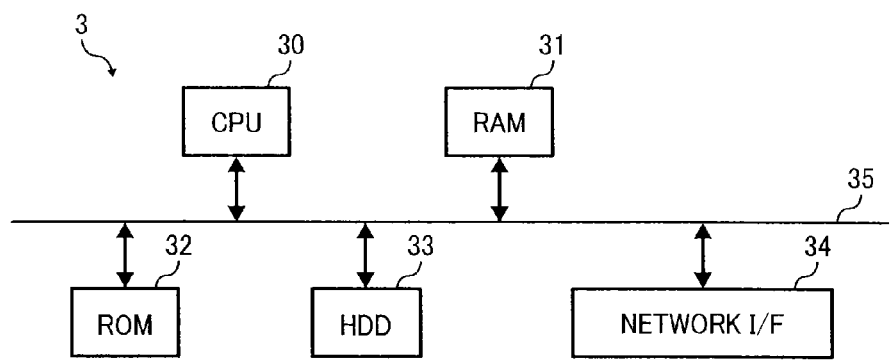
FIG. 5 is a block diagram of a hardware configuration of a parent device of a first example embodiment.

FIG. 5 is a block diagram of a hardware configuration of the parent device 3 of the first example embodiment. As illustrated in FIG. 5, the parent device 3 includes, for example, a central processing unit (CPU) 30, a random access memory (RAM) 31, a read only memory (ROM) 32, a hard disk drive (HDD) 33, and a network interface (I/F) 34. Each of these units 30 to 34 of the parent device 3 can be connected with each other via a bus 35. The CPU 30 conducts information processing by controlling these units 30 to 34. The RAM 31 temporarily stores data required for information processing by the CPU 30. The ROM 32 stores programs executable by the CPU 30. The HDD 33 is used as a storing unit of the parent device 3. The network I/F 34 connects the parent device 3 to the network 4. Further, as described below, the parent device 3 includes a plurality of functionalities devisable by executing programs by the CPU 30.

Figure 6:
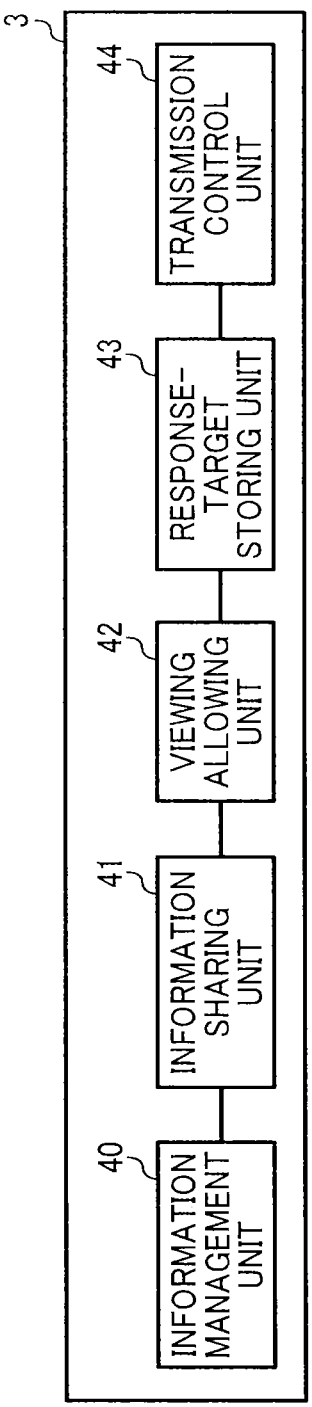
FIG. 6 is a functional block diagram of a parent device of a first example embodiment.

FIG. 6 is a functional block diagram of the parent device 3 of the first example embodiment. As illustrated in FIG. 6, the parent device 3 includes, for example, an information management unit 40, an information sharing unit 41, a viewing allowing unit 42, a response-target storing unit 43, and a transmission control unit 44.

The information management unit 40 stores the received data reported from the information reporting unit 13 of the reception child device 2A, and the transmission/reception information of the received data in the HDD 33, and manages the received data and the transmission/reception information stored in the HDD 33. In this process, the information management unit 40 classifies the received data and the transmission/reception information as a given file, for example, based on the transmission/reception information, and manages the received data and the transmission/reception information.

The received data and the transmission/reception information stored in the HDD 33 can be shared in the communication system 1 by the information sharing unit 41. When viewing of the received data is requested by the viewing request reporting unit 20 of the user child device 2B, the viewing allowing unit 42 allows the user child device 2B to view the received data stored in the HDD 33. Based on an allowance by the viewing allowing unit 42, the user child device 2B can access the HDD 3 via the information sharing unit 41. The response-target storing unit 43 stores that the selected received data reported from the response-target reporting unit 21 of the user child device 2B is the received data of response-target.

When a transmission of transmission data is requested by the transmission request reporting unit 23 of the user child device 2B, the transmission control unit 44 controls transmission of transmission data, and instructs the reception child device 2A to transmit the transmission data obtained from the user child device 2B. In this process, the transmission control unit 44 obtains an identifier of the reception child device 2A and the FAX number of the external apparatus from the transmission/reception information stored in the HDD 33, and reports the FAX number of the external apparatus, which is a transmission destination of transmission data, with the transmission data to the reception child device 2A identified by the identifier.

Figure 7:
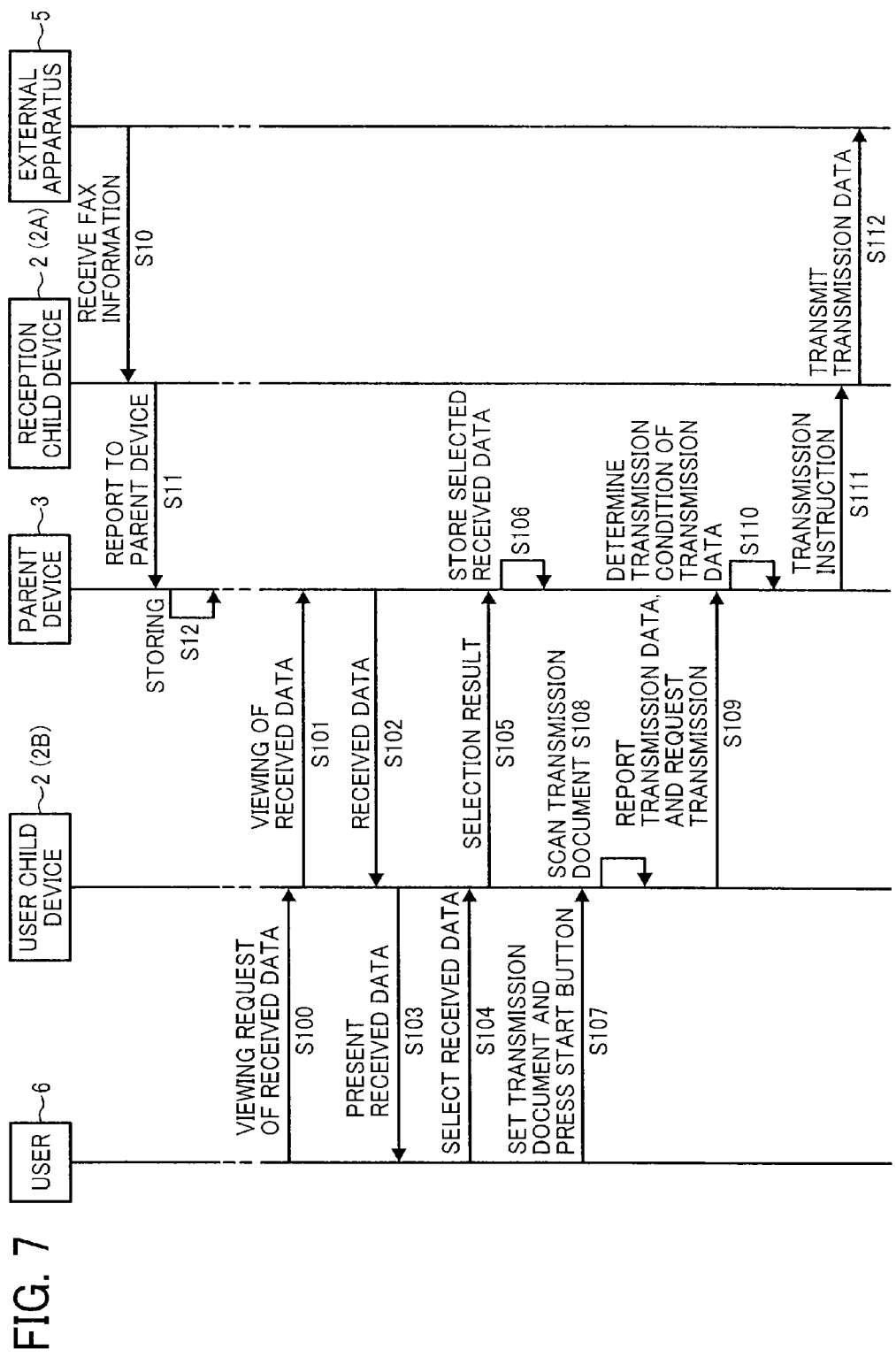
FIG. 7 is a sequential chart of a communication flow of communication system of a first example embodiment.
Figure 8:
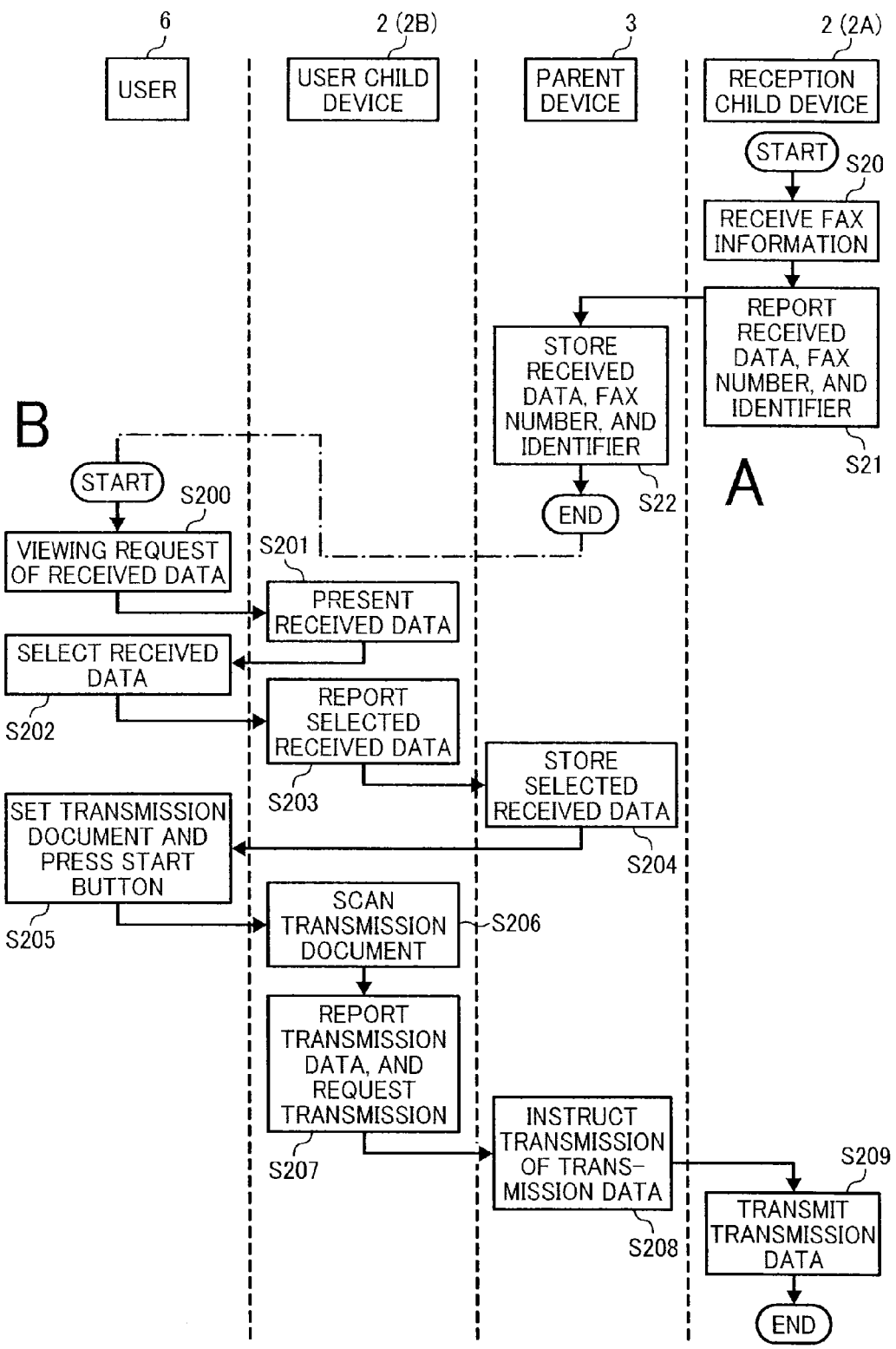
FIG. 8 is a flowchart showing the steps of a communication flow by a communication system of the first example embodiment.

A description is given of a communication flow by the communication system 1. The communication flow includes two steps such as a step of storing received data and accumulating received data (storing process), and a step of transmitting data to the external apparatus (transmission process). FIG. 7 is a sequential chart of a communication flow by the communication system 1 of the first example embodiment, in which the storing step of received data and the transmission step of transmission data are described in one chart. FIG. 8 is a flowchart showing the steps of a communication flow by the communication system 1 of the first example embodiment, corresponding to the sequential chart of FIG. 7. Further, FIG. 8A is a flowchart showing the steps of storing process of received data, and FIG. 8B is a flowchart showing the steps of transmission process of transmission data. FIG. 9 shows communication situation in the communication system 1 of the first example embodiment.

As illustrated in the drawing, when the FAX receiving unit 10 of the reception child device 2A receives FAX information from the external apparatus 5 (FIG. 7: S10, FIG. 8: S20), the FAX number storing unit 12 of the reception child device 2A stores the FAX number of the external apparatus indicating a transmission sender of the received data.

Further, the information reporting unit 13 of the reception child device 2A reports the received data (e.g., received image data) received from the external apparatus 5, and the transmission/reception information of the received data (e.g., FAX number of the external apparatus 5, identifier of the reception child device 2A) to the parent device 3 (FIG. 7: S11, FIG. 8: S21), in which when the reception child device 2A receives the received data, the information reporting unit 13 of the reception child device 2A reports the received data and the transmission/reception information to the parent device 3, in which the information reporting unit 13 can be used as a received data and transmission/reception information reporting unit (see FIG. 9A).

When the reception child device 2A receives the received data, the information management unit 40 of the parent device 3 obtains the received data and the transmission/reception information from the reception child device 2A, in which the information management unit 40 can be used as a received data and transmission/reception information obtaining unit. The information management unit 40 stores the obtained received data and the transmission/reception information in the HDD 33 of the parent device 3 (FIG. 7: S12, FIG. 8: S22). With this configuration, the HDD 33 stores the received data received by the reception child device 2A, and also the transmission/reception information including the FAX number of the external apparatus 5 indicating a transmission sender of the received data, and the identifier of the reception child device 2A that has received the received data. Further, when each one of the reception child devices 2A receives data each time, the above described storing process of received data is repeated, and the received data and the transmission/reception information are stored in the HDD 33. With this configuration, the received data and the transmission/reception information reported from each of the reception child devices 2A can be accumulated in the HDD 33.

When to transmit transmission data to the external apparatus 5 (see FIG. 9B), a user 6 operates the operation panel 202 of the user child device 2B to request viewing of the received data stored in the HDD 33 of the parent device 3 (FIG. 7: S100, FIG. 8: S200). In response to this user's operation, the user child device 2B uses the viewing request reporting unit 20 to report a viewing request to the parent device 3 to request viewing of the received data to the parent device 3 (FIG. 7: S101).

Further, the user child device 2B uses a received data presenting unit to access the HDD 33 of the parent device 3 and refers the received data (FIG. 7: S102), and presents the received data stored in the HDD 33 to the user 6 (FIG. 7: S103, FIG. 8: S201), in which the received data presenting unit displays, for example, information related to the received data (e.g., thumbnail of received data, name of received data) on the operation panel 202 to present the received data to the user 6.

Then, the user 6 operates the operation panel 202 of the user child device 2B to select received data of the response target from the presented received data (FIG. 7: S104, FIG. 8: S202). As to the selection of received data, the user child device 2B includes a selection unit, which may be the operation panel 202, to select received data stored in the HDD 33 of the parent device 3, with which the received data stored in the HDD 33 3 can be selected by the user 6 by using the selection unit.

Then, the response-target reporting unit 21 of the user child device 2B reports a selection result by the selection unit used by the user 6 to the parent device 3 (FIG. 7: S105, FIG. 8: S203), in which the selection result indicates which received data is selected as the received data of the response target. In this processing, the response-target reporting unit 21 can be also used as a selection result reporting unit, in which based on the selection by the user 6, the response-target reporting unit 21 reports the received data, selected by the user 6 from the received data stored in the HDD 33, to the parent device 3.

The transmission control unit 44 of the parent device 3 can be used as a reception unit that receives a selection to the received data stored in the HDD 33, and the transmission control unit 44 receives a selection of received data from the received data stored in the HDD 33 via the above described selection unit. Further, the transmission control unit 44 can be used as an identification unit for the selected received data. Based on the selection by the user 6, the transmission control unit 44 identifies the selected received data selected by the user 6 from one or more received data stored in the HDD 33. In this process, when the response-target reporting unit 21 reports a selection result selected by the user 6, the transmission control unit 44 identifies the selected received data based on the selection result by the above described selection unit used by the user 6. Then, the response-target storing unit 43 of the parent device 3 stores that the selected received data is the received data of the response-target selected by the user 6 (FIG. 7: S106, FIG. 8: S204).

Then (see FIG. 9C), the user 6 sets transmission document to the user child device 2B and presses a start button on the operation panel 202 to request the user child device 2B to obtain transmission data and to transmit the transmission data (FIG. 7: S107, FIG. 8: S205). Based on a request by the user 6, the document scanning unit 22 of the user child device 2B scans the transmission document (FIG. 7: S108, FIG. 8: S206) to obtain transmission data used as response-transmission data with respect to the selected received data. This transmission data is composed of transmission image data, which is image data of the transmission document.

The document scanning unit 22 can be used as a transmission data obtaining unit, and a transmission data input unit. The user 6 inputs transmission data to the user child device 2B using the document scanning unit 22, with which the document scanning unit 22 obtains the transmission data. The transmission data input by the user 6 (i.e., obtained transmission data) is reported to the parent device 3 by the transmission request reporting unit 23 used as a transmission data reporting unit. The transmission control unit 44 of the parent device 3 can be used as a transmission data obtaining unit. When the transmission data is reported from the transmission request reporting unit 23, the transmission control unit 44 obtains the transmission data to be transmitted to the external apparatus 5, which is the transmission sender of the selected received data, from the user child device 2B.

Further, the transmission request reporting unit 23 can be used as a transmission requesting unit of transmission data, in which the transmission request reporting unit 23 reports a transmission request to the parent device 3 to request the parent device 3 to transmit the transmission data to the external apparatus 5 (FIG. 7: S109, FIG. 8: S207).

When transmission of the transmission data is requested by the user child device 2B, based on the transmission/reception information stored in the HDD 33, the transmission control unit 44 of the parent device 3 determines transmission condition of the transmission data (FIG. 7: S110). Further, the transmission control unit 44 can be used as an instruction unit that instructs transmission of the transmission data, in which the transmission control unit 44 instructs the reception child device 2A, which has received the selected received data, to transmit the transmission data to the external apparatus 5 (FIG. 7: S111, FIG. 8: S208). Specifically, the transmission control unit 44, used as the transmission/reception information obtaining unit, obtains the selected received data and the transmission/reception information stored in the HDD 33. In this processing, the transmission control unit 44 obtains FAX number of the external apparatus 5, which is the transmission sender of the selected received data, and an identifier of the reception child device 2A, which has received the selected received data, from the HDD 33, and then determines the reception child device 2A, to be used for transmitting the transmission data, and the FAX number of the transmission destination of the transmission data.

Then, the transmission control unit 44 reports the transmission data, which is to be transmitted to the external apparatus 5, and the obtained FAX number of the external apparatus 5 to the reception child device 2A having the obtained identifier, and also instructs the reception child device 2A to transmit the transmission data to the external apparatus 5 having the reported FAX number.

Based on a transmission instruction by the transmission control unit 44, the FAX transmission unit 11 of the reception child device 2A transmits the transmission data to the external apparatus 5 instructed as a transmission destination using the FAX number reported from the transmission control unit 44 (FIG. 7: S112, FIG. 8: S209). In this processing, based on the transmission/reception information stored in the HDD 33, the transmission control unit 44 transmits the transmission data to the external apparatus 5, which is the transmission sender of the selected received data, using the reception child device 2A that has received the selected received data. With this processing, the transmission data can be transmitted to the external apparatus 5, which is the transmission sender of the selected received data, from the reception child device 2A that has received the selected received data, which is one of a plurality of the child devices 2 used as the reception child device 2A.

As to the above described communication system 1, the parent device 3, and the communication method using the communication system 1 and the parent device 3, transmission data can be easily transmitted to the external apparatus 5, which is the transmission sender of the received data, from the reception child device 2A, which has received the received data (selected received data) without causing burden of the user 6. In this processing, the user 6 is not required to determine the reception child device 2A and the external apparatus 5, and a response to the received data can be conducted easily. Further, without moving to the reception child device 2A that has received the received data, the user 6 can transmit the transmission data to the external apparatus 5 using any one of the child devices 2.

Further, as to a plurality of the child devices 2, because each one of the child devices 2 can function as the reception child device 2A and the user child device 2B, each one of the child devices 2 can function as the reception child device 2A and the user child device 2B in the communication system 1. Further, if the parent device 3 has function of the reception child device 2A and the user child device 2B, the parent device 3 can also function as the reception child device 2A and the user child device 2B in the communication system 1. Further, the reception child device 2A that has received the selected received data 2A and the user child device 2B used by the user 6 for transmission of transmission data can be different child devices 2 or the same child device 2. Further, as a purpose of other than transmitting a response to the received data, transmission data can be transmitted to the external apparatus 5, which is the transmission sender of the selected received data, using the above process.

A description is given of other example embodiments such as second to seventh example embodiments of the communication system 1. The communication system 1 of the second to seventh example embodiments can be configured similar to the communication system 1 of the first example embodiment, and have the same effect the communication system 1 of the first example embodiment. Therefore, different points of the second to seventh example embodiments are described in detail. Further, as to the communication system 1 of the first to seventh example embodiment, the same configuration is attached with the same reference.

(Second Example Embodiment)

Figure 10:
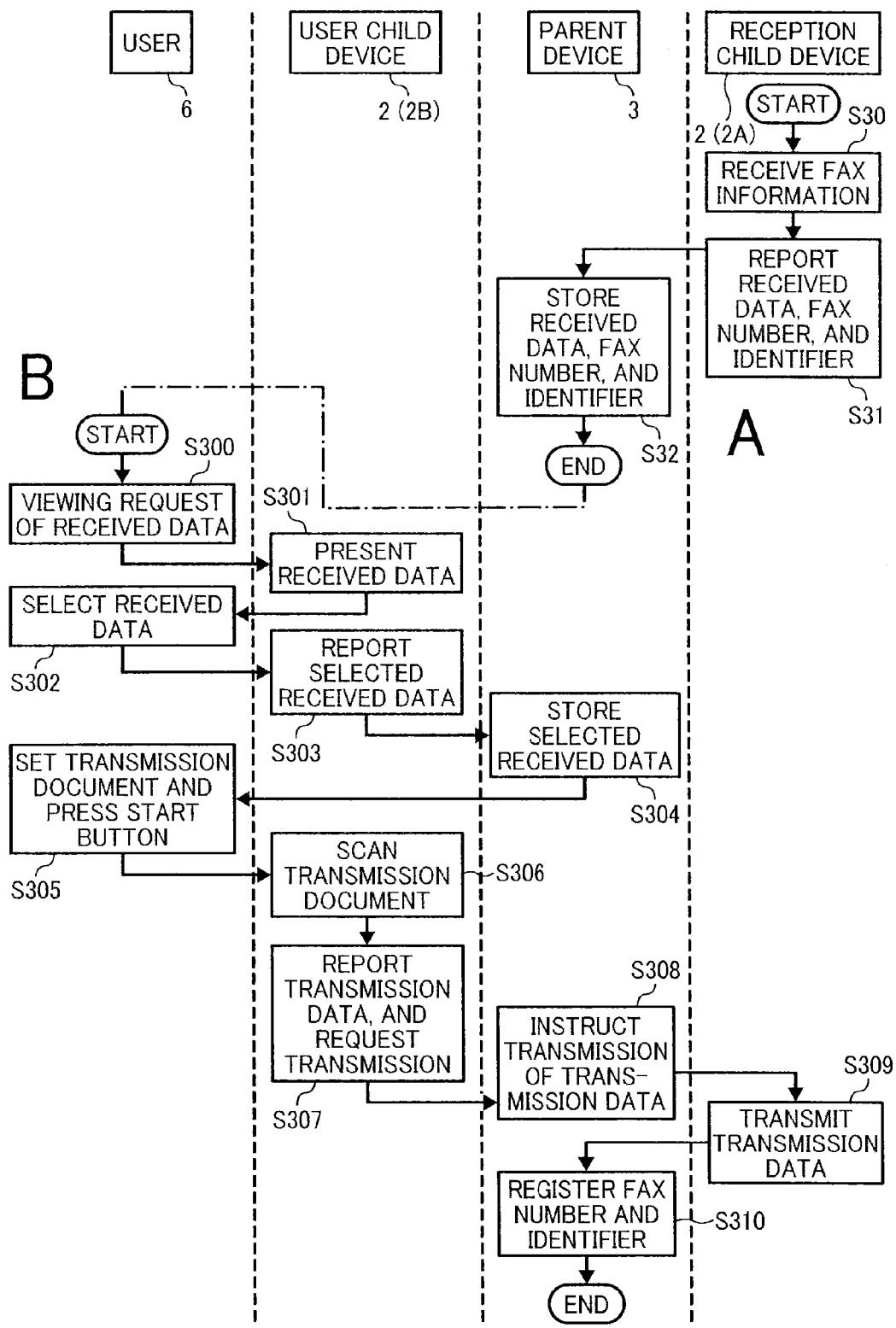
FIG. 10 is a flowchart showing the steps of a communication flow by a communication system of a second example embodiment.

FIG. 10 is a flowchart showing the steps of a communication flow in the communication system 1 of the second example embodiment. Compared to the communication flow shown in FIG. 8 described as the first example embodiment, the communication flow shown in FIG. 10 is different at step S310 after transmitting transmission data (S309), which means other processes are same as the communication flow shown in FIG. 8. Therefore, the processes at S30 to S32 and S300 to S309 (i.e., steps before S310) are same as the processes at S20 to S22 and S200 to S209 shown in FIG. 8.

In this configuration, the information management unit 40 of the parent device 3 can be used as an accumulation unit that accumulates transmission information of transmission data in the HDD 33. The transmission information includes FAX number of the external apparatus 5, which is a transmission destination to be transmitted with transmission data, and an identifier of the reception child device 2A used for transmission of transmission data among a plurality of the child devices 2 useable as the reception child device 2A. Upon completing the transmission of the transmission data to the external apparatus 5 (S309), the information management unit 40 registers the FAX number and the identifier to an address area such as an address list set in the HDD 33 of the parent device 3 (S310), and stores the FAX number and the identifier by correlating with each other in the HDD 33. Further, when transmission data is transmitted to the external apparatus 5 each time, the information management unit 40 stores the FAX number and the identifier in the HDD 33 by correlating the FAX number and identifier with each other, and accumulates the transmission information including the FAX number and the identifier.

When transmission data is to be transmitted to the external apparatus 5 without conducting a selection of the received data, the user 6 designates the FAX number of the external apparatus 5 by using the user child device 2B, and inputs transmission data by using the user child device 2B. Then, based on a transmission request by the user 6, the transmission request reporting unit 23 of the user child device 2B reports the FAX number of the external apparatus 5 designated by the user 6, and the transmission data input by the user 6 to the parent device 3.

Further, the transmission request reporting unit 23 requests the parent device 3 to transmit the transmission data to the external apparatus 5 having the reported FAX number. Based on this transmission request, the transmission control unit 44 of the parent device 3 obtains the identifier of the reception child device 2A correlated to the FAX number of the external apparatus 5 from the transmission information in the address area such as an address list, and designates the reception child device 2A having the obtained identifier as one child device 2 to be used for transmission of the transmission data. In this processing, the transmission control unit 44 can be used as a designating unit for designating the child device 2. The transmission control unit 44 designates the child device 2 upon receiving a transmission request of transmission data to the external apparatus 5 included in the transmission information (e.g., FAX number of the external apparatus 5), in which the transmission control unit 44 designates the child device 2 to be used for data transmission to the external apparatus 5 from the plurality of the child devices 2A based on the transmission information accumulated by the information management unit 40.

Then, based on the transmission request, the transmission control unit 44 transmits the transmission data from the designated child device 2, in which the transmission control unit 44 reports the transmission data and the FAX number of the external apparatus 5 to the designated child device 2 (reception child device 2A), and instructs the designated child device 2 to transmit the transmission data to the external apparatus 5 having the reported FAX number. Based on a transmission instruction by the transmission control unit 44, the FAX transmission unit 11 of the reception child device 2A transmits the transmission data to the external apparatus 5 using the FAX number reported from the transmission control unit 44.

By transmitting the transmission data as above described, transmission data can be easily transmitted to the external apparatus 5, which is the transmission sender of the received data, from the reception child device 2A that has received the received data. Further, as a purpose of other than transmitting a response to the received data, transmission data can be transmitted to the external apparatus 5 using a suitable child device 2.

(Third Example Embodiment)

Figure 11:
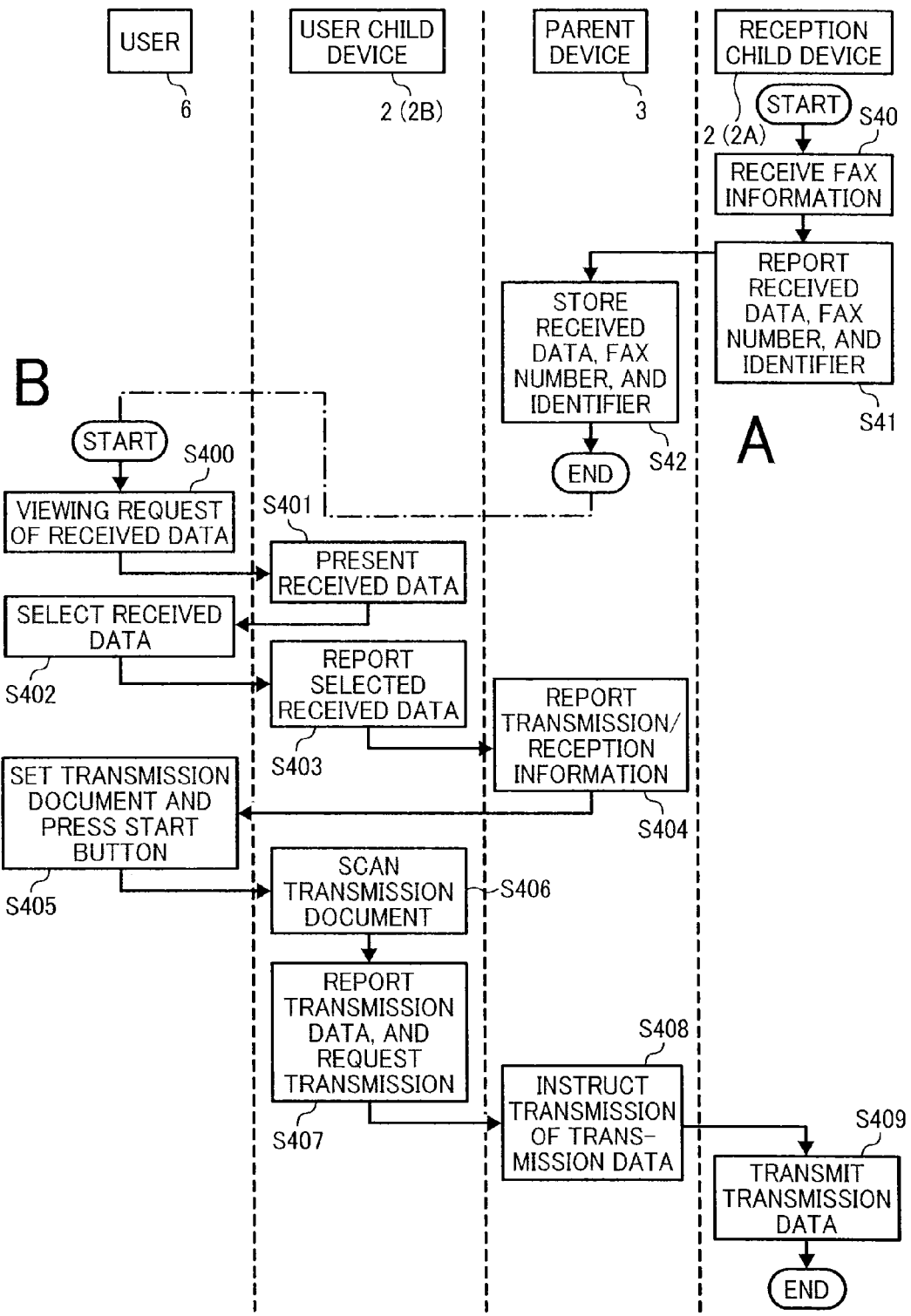
FIG. 11 is a flowchart showing the steps of a communication flow by a communication system of a third example embodiment.

FIG. 11 is a flowchart showing the steps of a communication flow in the communication system 1 of a third example embodiment. Compared to the communication flow shown in FIG. 8 described as the first example embodiment, the communication flow shown in FIG. 11 is different at step S404 and subsequent steps, which means other processes are same as the communication flow shown in FIG. 8. Therefore, the processes at S40 to S42 and S400 to S403 (i.e., before step S404) are same as the processes at S20 to S22 and S200 to S203 shown in FIG. 8.

In this configuration, the user 6 selects the received data using the operation panel 202, which can be used as the selection unit, and the selected received data is reported to the parent device 3 (S403). Then, the information management unit 40 of the parent device 3 obtains the selected received data and the transmission/reception information stored in the HDD 33.

Then, the information management unit 40 reports the obtained transmission/reception information to the user child device 2B (S404), and the transmission request reporting unit 23 of the user child device 2B obtains the transmission/reception information from the parent device 3. Therefore, the transmission request reporting unit 23 can be used as a transmission/reception information obtaining unit, in which when the user 6 selects the received data using the selection unit, the transmission request reporting unit 23 obtains the selected received data and the transmission/reception information stored in the HDD 33. In this configuration, the transmission request reporting unit 23 obtains the FAX number of the external apparatus 5, which is the transmission sender of the selected received data, and the identifier of the reception child device 2A that has received the selected received data.

Then, the user 6 sets transmission document to the user child device 2B and presses a start button to request the user child device 2B to obtain transmission data and transmit the transmission data (S405). Based on a request by the user 6, the document scanning unit 22 of the user child device 2B scans the transmission document (S406) to obtain transmission data. Then, the transmission request reporting unit 23 reports the transmission data to the parent device 3, and requests the parent device 3 to transmit the transmission data to the external apparatus 5 (S407), in which the transmission request reporting unit 23 requests the parent device 3 to transmit the transmission data to the external apparatus 5 having the obtained FAX number by using the reception child device 2A having the obtained identifier.

The transmission control unit 44 of the parent device 3 reports the transmission data and the FAX number to be used for transmission of transmission data to the reception child device 2A designated by the transmission request reporting unit 23, and instructs the reception child device 2A to transmit the transmission data to the external apparatus 5 having the reported FAX number (S408). Based on a transmission instruction by the transmission control unit 44, the FAX transmission unit 11 of the reception child device 2A transmits the transmission data to the external apparatus 5 using the FAX number reported from the transmission control unit 44 (S409).

In the above described configuration, the transmission control unit 44 controls transmission of transmission data, and conducts transmission of transmission data based on the transmission/reception information obtained by the transmission request reporting unit 23 of the user child device 2B. In this configuration, the transmission request reporting unit 23 can obtain the transmission/reception information, with which the transmission/reception information can be managed by the user child device 2B, and the transmission data can be also managed using the transmission/reception information by the user child device 2B.

(Fourth Example Embodiment)

Figure 12:
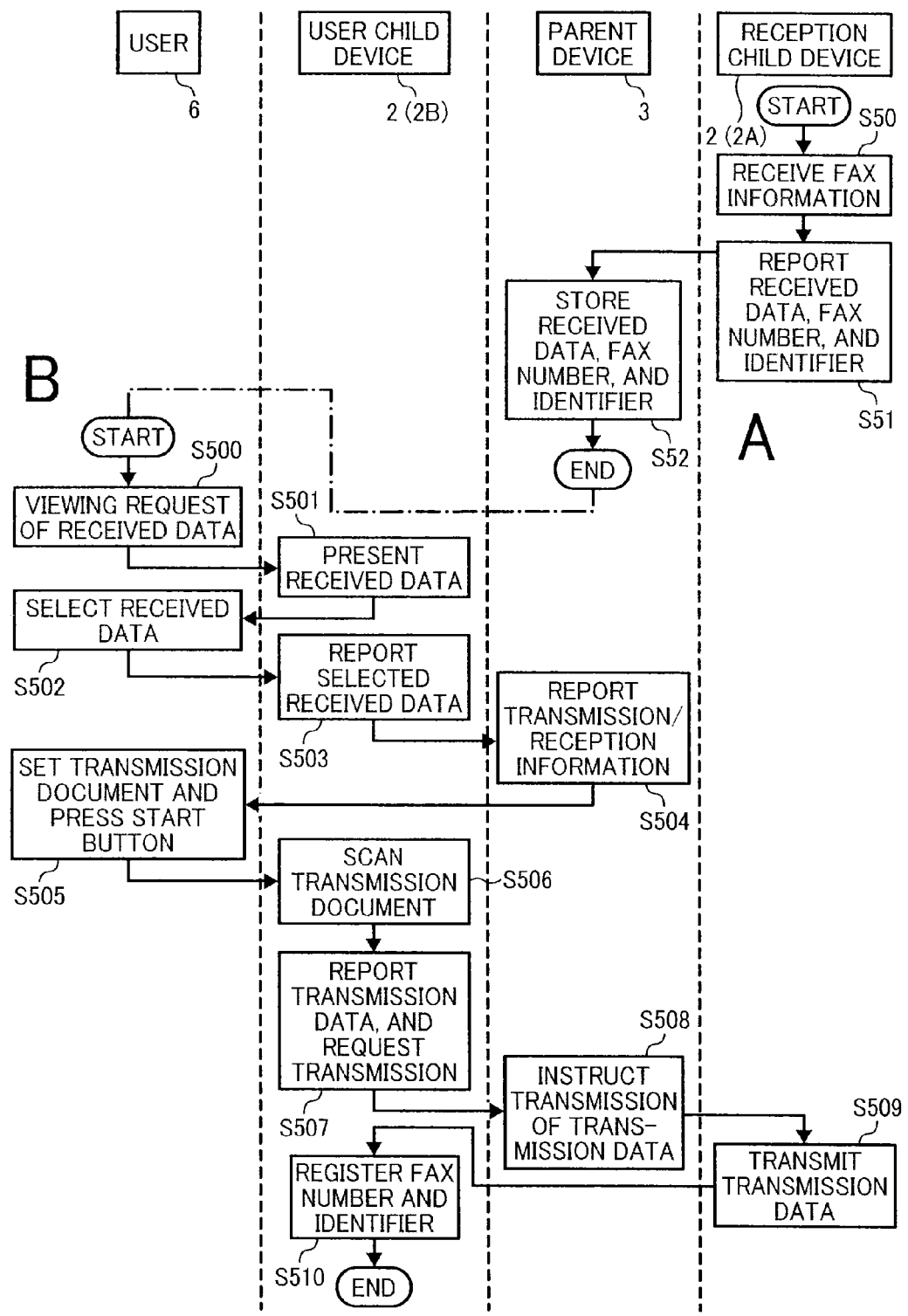
FIG. 12 is a flowchart showing the steps of a communication flow by a communication system of a fourth example embodiment.

FIG. 12 is a flowchart showing the steps of communication flow by the communication system 1 of a fourth example embodiment. Compared to the communication flow shown in FIG. 11 described as the third example embodiment, the communication flow shown in FIG. 12 is different at step S510 conducted after transmitting transmission data (S509), which means other processes are same as the communication flow shown in FIG. 11. Therefore, the processes at S50 to S52 and S500 to S509 (i.e., steps before S510) are same as the processes at S40 to S42 and S400 to S403 shown in FIG. 11.

In this configuration, the user child device 2B includes an accumulation unit that accumulates transmission information of transmission data in the HDD 233. As described in the second example embodiment, the transmission information includes FAX number of the external apparatus 5, which is a transmission destination to be transmitted with transmission data, and an identifier of the reception child device 2A to be used for transmission of transmission data among a plurality of the child devices 2 usable as the reception child device 2A.

Upon completing the transmission of transmission data to the external apparatus 5 (S509), the accumulation unit registers the FAX number of the external apparatus 5 and the identifier of the reception child device 2A obtained by the transmission request reporting unit 23 to the address area such as an address list set in the HDD 233 of the user child device 2B (S510). In this configuration, the accumulation unit stores the FAX number and the identifier in the HDD 233 by correlating with each other, and accumulates the transmission information including the FAX number and the identifier.

When transmission data is to be transmitted to the external apparatus 5 without conducting a selection of the received data, the user 6 designates the FAX number of the external apparatus 5 by using the user child device 2B, inputs the transmission data, and requests transmission of the transmission data by using the user child device 2B. Then, based on the FAX number of the external apparatus 5 designated by the user 6, the transmission request reporting unit 23 of the user child device 2B obtains the identifier of the reception child device 2A correlated with and the FAX number of the external apparatus 5r from the transmission information in the address area such as an address list. This reception child device 2A having the obtained identifier is designated as the child device 2 to be used for transmitting transmission data by the transmission request reporting unit 23. Therefore, the transmission request reporting unit 23 can be used as a designating unit for designating the child device 2. The transmission request reporting unit 23 designates the child device 2 upon receiving a transmission request of the transmission data to the external apparatus 5 included in the transmission information (e.g., FAX number of the external apparatus 5), in which the transmission request reporting unit 23 designates the child device 2 to be used for data transmission to the external apparatus 5 from the plurality of the child devices 2A based on the transmission information accumulated by the accumulation unit.

Then, the transmission request reporting unit 23 reports the transmission data, the identifier of the designated child device 2 (reception child device 2A), and the FAX number of the external apparatus 5 to the parent device 3. Further, the transmission request reporting unit 23 requests the parent device 3 to transmit the transmission data to the external apparatus 5 having the reported FAX number by using the reception child device 2A having the reported identifier. Then, based on a transmission request, the transmission control unit 44 of the parent device 3 transmits the transmission data to the external apparatus 5 having the reported FAX number from the designated reception child device 2A, in which the transmission control unit 44 reports the transmission data and the FAX number of the external apparatus 5 to the reception child device 2A, and instructs the reception child device 2A to transmit the transmission data to the external apparatus 5 having the reported FAX number. Based on a transmission instruction by the transmission control unit 44, the FAX transmission unit 11 of the reception child device 2A transmits the transmission data to the external apparatus 5 using the FAX number reported from the transmission control unit 44. With this configuration, the same or similar effect of the second example embodiment can be obtained for the third example embodiment.

(Fifth Example Embodiment)

Figure 13:
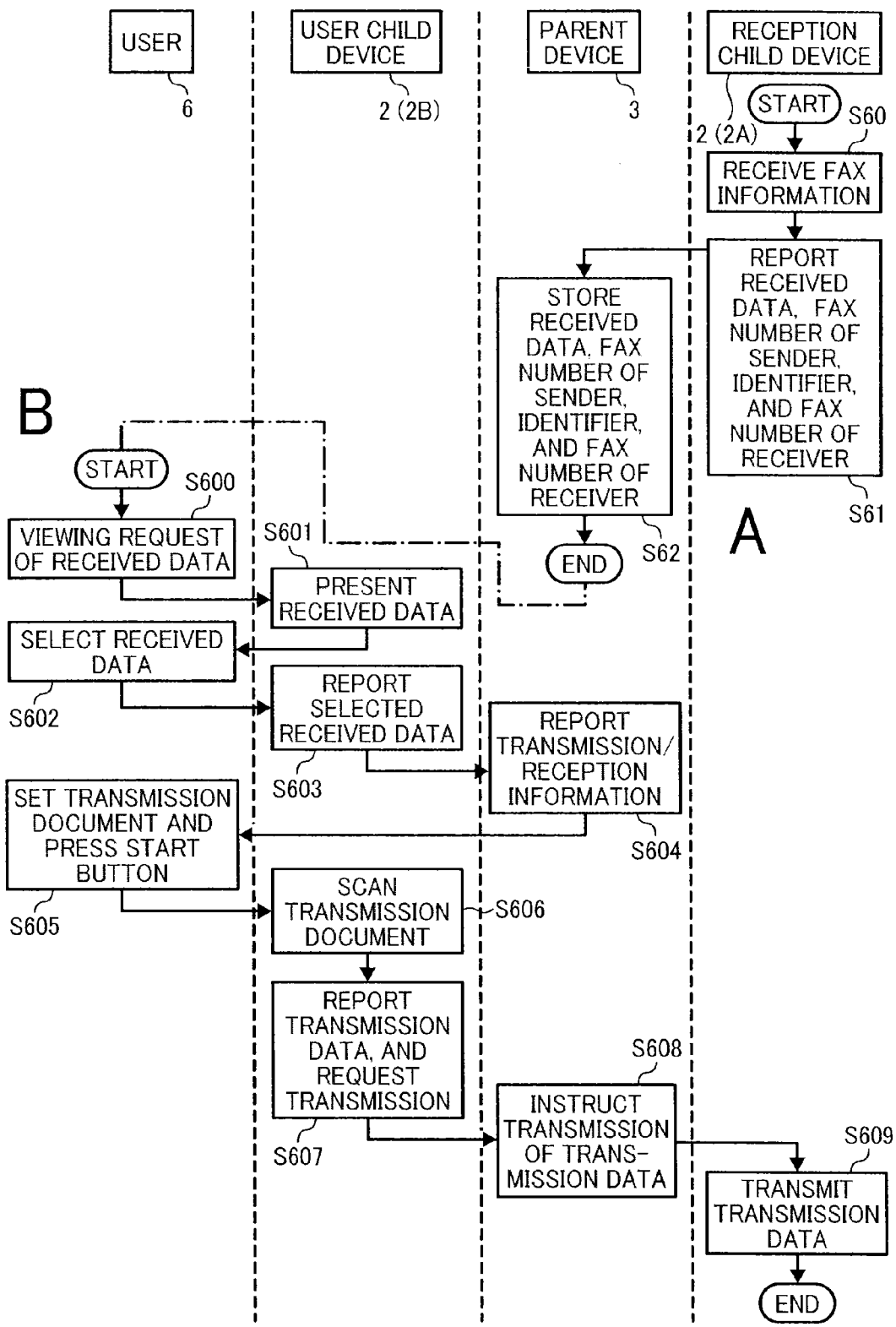
FIG. 13 is a flowchart showing the steps of a communication flow by a communication system of a fifth example embodiment.

FIG. 13 is a flowchart showing the steps of a communication flow in the communication system 1 of a fifth example embodiment. Compared to the communication flow shown in FIG. 8 described as the first example embodiment, the communication flow shown in FIG. 13 (S60 to S62, S600 to S609) is almost same as the communication flow shown in FIG. 8 (S20 to S22, S200 to S209) except some processes. Therefore, different points of the communication flow shown in FIG. 13 are described.

In this configuration, the child device 2 has a plurality of FAX numbers used for communication with the external apparatus 5 via a communication line. The FAX number is an example of communication number of the child device 2 used for a communication line, and can be set to the child device 2 in advance. When the FAX receiving unit 10 of the reception child device 2A receives FAX information from the external apparatus 5 using a given FAX number (S60), the information reporting unit 13 reports the received data and the transmission/reception information of the received data to the parent device 3 (S61). This transmission/reception information includes the FAX number of the external apparatus 5 (i.e., FAX number of the transmission sender) indicating a transmission sender of the received data, the identifier of the reception child device 2A that has received the received data, and the FAX number of the reception child device 2A used for receiving data (i.e., FAX number used for reception).

The information management unit 40 of the parent device 3 stores the received data obtained from the reception child device 2A, and the transmission/reception information in the HDD 33 of the parent device 3 (S62). In this configuration, the HDD 33 stores the FAX number of the reception child device 2A used for reception in the transmission/reception information.

When transmitting transmission data, the transmission control unit 44 of the parent device 3 obtains the selected received data and the transmission/reception information stored in the HDD 33, and based on the transmission/reception information, the transmission control unit 44 instructs transmission of the transmission data to the external apparatus 5 (S608), in which the transmission control unit 44 reports the transmission data, the FAX number of the transmission sender, and the FAX number used for reception to the reception child device 2A, and instructs the reception child device 2A to transmit the transmission data to the external apparatus 5 having the reported FAX number of the transmission sender using the reported FAX number used for reception. Based on the FAX number used for reception reported from the transmission control unit 44, the FAX transmission unit 11 of the reception child device 2A selects a FAX number to be used for communication line, and transmits the transmission data to the external apparatus 5 using the selected FAX number (S609).

In the above described configuration, based on the transmission/reception information, the transmission control unit 44 transmits the transmission data to the external apparatus 5, which is the transmission sender of the selected received data, using the reception child device 2A that has received the selected received data using the FAX number used for reception of the reception child device 2A, which is used for receiving the selected received data. With this configuration, even if the child device 2 has a plurality of FAX numbers, the transmission data can be easily transmitted to the external apparatus 5 using a suitable FAX number. Further, for example, transmission data can be transmitted to the external apparatus 5 using a FAX number registered in the external apparatus 5.

(Sixth Example Embodiment)

Figure 14:
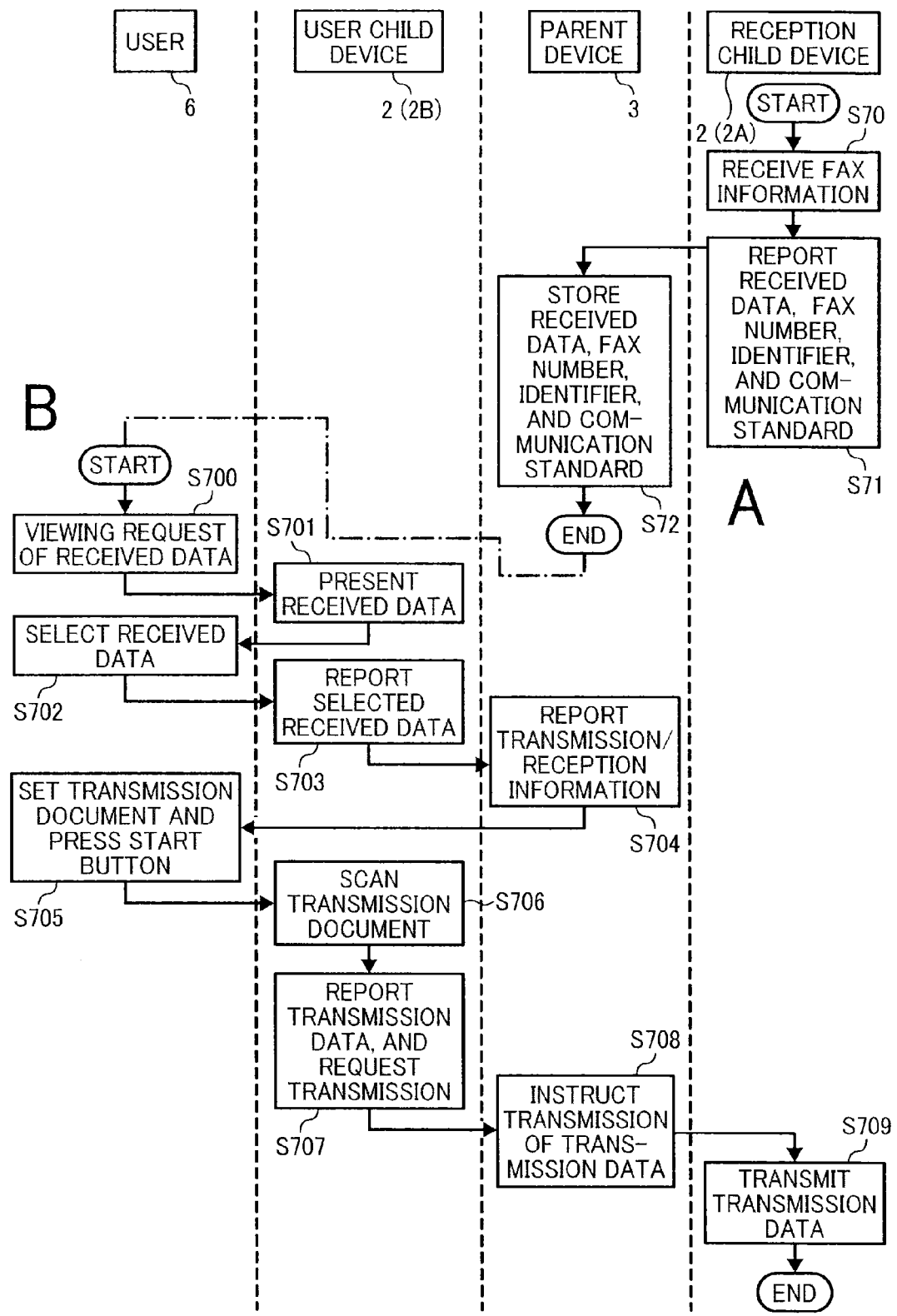
FIG. 14 is a flowchart showing the steps of a communication flow by a communication system of a sixth example embodiment.

FIG. 14 is a flowchart showing the steps of a communication flow in the communication system 1 of a sixth example embodiment. Compared to the communication flow shown in FIG. 8 described as the first example embodiment, the communication flow shown in FIG. 14 (S70 to S72, S700 to S709) is almost same as the communication flow shown in FIG. 8 (S20 to S22, S200 to S209) except some processes. Therefore, different points of the communication flow shown in FIG. 14 is described.

In this configuration, the child device 2 has a communication unit such as the FAX receiving unit 10 and the FAX transmission unit 11 that can communicate with the external apparatus 5 via a communication line using a plurality of communication standards (e.g., G3, G4, IP-FAX). When the FAX receiving unit 10 of the reception child device 2A receives FAX information from the external apparatus 5 using a given communication standard, which can be used when receiving communication (S70), the information reporting unit 13 reports the received data and the transmission/reception information of the received data to the parent device 3 (S71). The transmission/reception information includes, for example, FAX number of the external apparatus 5 indicating a transmission sender of the received data, an identifier of the reception child device 2A that has received the received data, and the communication standard of the reception child device 2A used for receiving data by the reception child device 2A. The information management unit 40 of the parent device 3 stores the received data obtained from the reception child device 2A and the transmission/reception information in the HDD 33 of the paint device 3 (S72). In this configuration, the HDD 33 stores the communication standard of the reception child device 2A in the transmission/reception information.

When transmitting the transmission data, the transmission control unit 44 of the parent device 3 obtains the selected received data and the transmission/reception information stored in the HDD 33, and instructs transmission of the transmission data to the external apparatus 5 based on the transmission/reception information (S708), in which the transmission control unit 44 reports the transmission data, the FAX number of the external apparatus 5, and the communication standard of the reception child device 2A to the reception child device 2A, and instructs the reception child device 2A to transmit the transmission data to the external apparatus 5 having the reported FAX number using the reported communication standard. Based on the communication standard reported from the transmission control unit 44, the FAX transmission unit 11 of the reception child device 2A selects a communication standard for the communication line, and transmits the transmission data to the external apparatus 5 using the selected communication standard (S709).

In the above described configuration, based on the transmission/reception information, the transmission control unit 44 transmits the transmission data to the external apparatus 5, which is the transmission sender of the selected received data by using the reception child device 2A that has received the selected received data and the communication standard of the reception child device 2A used for receiving the selected received data. With this configuration, even if the child device 2 conducts communication using a plurality of communication standards, the transmission data can be easily transmitted to the external apparatus 5 using a communication standard used for receiving data. Further, transmission data can be easily transmitted to the external apparatus 5 using a communication standard matched to the external apparatus 5.

(Seventh Example Embodiment)

FIG. 15 is a flowchart showing the steps of a communication flow by the communication system 1 of a seventh example embodiment. Compared to the communication flow shown in FIG. 8 described as the first example embodiment, the communication flow shown in FIG. 15 is different at step S810 after transmitting transmission data (S809), which means other processes are same as the communication flow shown in FIG. 8. Therefore, the processes at S80 to S82 and S800 to S809 (i.e., steps before S810) are same as the processes at S20 to S22 and S200 to S209 shown in FIG. 8.

In this configuration, the information management unit 40 of the parent device 3 can be used as a transmission recording unit. When transmission data is transmitted to the external apparatus 5, the information management unit 40 records information that transmission of the transmission data is conducted to the external apparatus 5, which is the transmission sender of the selected received data, in the HDD 33. Specifically, upon completing the transmission of transmission data to the external apparatus 5 (S809), the reception child device 2A reports a transmission completion to the parent device 3. Then, the information management unit 40 adds the transmission completion information indicating that the transmission data is transmitted to the transmission/reception information stored with the selected received data, and records the information of transmission completion of transmission data to the transmission/reception information in the HDD 33 (S810). With this configuration, the user 6 can easily judge whether transmission data is transmitted or not, and also can correctly check whether a response is transmitted to the received data by looking the record in the HDD 33.

The above described example embodiments describe the communication system 1, the parent device 3 used as the information processing apparatus, and the communication method. The above described example embodiments can be devised using one or more programs and the parent device 3 by executing the programs using a computer of the parent device 3. Further, the communication system 1 described in the above example embodiments are examples of the communication system, and other communication systems matched to usage and purposes can be devised using various system configurations. Further, the communication systems of the first to seventh example embodiments can be combined as required.

In the above described example embodiments, the transmission sender information of the external apparatus 5 is FAX number of the external apparatus 5, the identification information of the child device 2 used as a communication apparatus is the identifier of the child device 2. However, the transmission sender information of the external apparatus 5 is not limited to the above example. The transmission sender information of the external apparatus 5 can be information that can transmit transmission data to the external apparatus 5. Further, the identification information of the child device 2 is not limited to the above example. The identification information of the child device 2 can be information that can identify the child device 2. For example, the identification information of the child device 2 can be FAX number of the child device 2, or a serial number of the child device 2. Further, the received data and transmission data are not limited to image data, but the received data and transmission data can be various data communicable by the communication system.

In the above described example embodiment, transmission data can be easily transmitted to an external apparatus, used as a transmission sender of received data, from a communication apparatus that has received data without a burden of a user.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a Wireless Application Protocol (WAP) or 3G-compliant phone) and so on. Since the present invention can be implemented as software, each and every aspect of the present invention thus encompasses computer software implementable on a programmable device.

The computer software can be provided to the programmable device using any storage medium or carrier medium for storing processor-readable code such as a floppy disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these.

The hardware platform includes any desired kind of hardware resources including, for example, a central processing unit (CPU), a random access memory (RAM), and a hard disk drive (HDD). The CPU may be implemented by any desired kind of any desired number of processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, workstation) may control an information processing apparatus or an image processing apparatus such as image forming apparatus using a computer-readable program, which can execute the above-described processes or steps. In the above-described embodiments, at least one or more of the units of apparatus can be implemented as hardware or as a combination of hardware/software combination. Each of the functions of the described embodiments may be implemented by one or more processing circuits. A processing circuit includes a programmed processor, as a processor includes circuitry. A processing circuit also includes devices such as an application specific integrated circuit (ASIC) and conventional circuit components arranged to perform the recited functions.

Numerous additional modifications and variations are possible in light of the above teachings. It is therefore to be understood that, within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. A communication system for one or more communication apparatuses communicable with an external apparatus, the communication system comprising:
- a storing unit to store data received by a communication apparatus from the external apparatus used as a transmission sender of the received data, and transmission/reception information including information of the external apparatus as transmission sender information and identification information of the communication apparatus used for receiving the received data;
- an identification unit to identify received data, selected by a user, from the received data stored in the storing unit;
- a transmission data obtaining unit to obtain transmission data to be transmitted to the external apparatus, which is the transmission sender of the selected received data identified by the identification unit; and
- a transmission control unit to transmit the transmission data to the external apparatus, which is the transmission sender of the selected received data, from the communication apparatus that has received the selected received data among the one or more communication apparatuses based on the transmission/reception information stored in the storing unit.

2. The communication system of claim 1, further comprising
- an accumulation unit to accumulate transmission information including transmission sender information, which is information of the external apparatus transmitted with the transmission data, and identification information of a communication apparatus used for transmitting the transmission data among the one or more communication apparatuses; and
- a designating unit to designate a communication apparatus to be used for transmitting data to the external apparatus among the one or more communication apparatuses based on the transmission information accumulated by the accumulation unit when receiving a transmission request of the transmission data, included in the transmission information to the external apparatus,
- wherein the transmission control unit transmits the transmission data from the communication apparatus designated by the designating unit based on the transmission request.

3. The communication system of claim 1, wherein the transmission control unit includes an instruction unit that instructs transmission of the transmission data to the external apparatus to the communication apparatus that has received the selected received data when transmission of transmission data is requested by one of the communication apparatus.

4. The communication system of claim 1, wherein the communication apparatus has a plurality of communication numbers useable for communication with the external apparatus,
- the storing unit stores a communication number used for receiving the received data by the communication apparatus in the transmission/reception information,
- the transmission control unit instructs the communication apparatus that has received the selected received data to transmit the transmission data to the external apparatus, which is the transmission sender of the selected received data, using the communication number used for receiving the selected received data.

5. The communication system of claim 1, wherein the communication apparatus includes a communication unit compatible with a plurality of communication standards each useable for communication with the external apparatus,
- wherein the storing unit stores a communication standard used by the communication apparatus for receiving the received data as a part of the transmission/reception information,
- wherein the transmission control unit instructs the communication apparatus that has received the selected received data to transmit the transmission data to the external apparatus, which is the transmission sender of the selected received data, using the communication standard used for receiving the selected received data.

6. The communication system of claim 1, further comprising a transmission recording unit to record information that the transmission data is transmitted to the external apparatus, which is the transmission sender of the selected received data.

7. The communication system of claim 1, wherein the communication apparatus includes a selection unit that allows a user to select the received data stored in the storing unit, and the identification unit identifies the selected received data based on user selection.

8. The communication system of claim 7, wherein the communication apparatus includes a transmission/reception information obtaining unit to obtain the transmission/reception information stored in the storing unit with the selected received data when the received data is selected at the selection unit by the user,
- wherein the transmission control unit conducts transmission of the transmission data based on the transmission/reception information obtained by the transmission/reception information obtaining unit.

9. The communication system of claim 1, further comprising an information processing apparatus to communicate with the communication apparatuses and to manage communication with the communication apparatuses,
- wherein the information processing apparatus includes the storing unit, the identification unit, the transmission data obtaining unit, and the transmission control unit.

10. The communication system of claim 9, wherein the communication apparatus includes a received data and transmission/reception information reporting unit that reports the received data and the transmission/reception information to the information processing apparatus when receiving the received data from the external apparatus.

11. The communication system of claim 9, wherein the communication apparatus includes a transmission data reporting unit that reports the transmission data, input by a user, to the information processing apparatus.

12. A communication method of controlling communication of one or more communication apparatuses with an external apparatus, the method comprising:
- storing, in a memory, data received by a communication apparatus from the external apparatus, and transmission/reception information including transmission sender information of the external apparatus indicating a transmission sender of the received data, and identification information of the communication apparatus used for receiving the received data, the communication apparatus being one or more of the communication apparatuses;
- identifying selected received data selectable by a user from the received data stored in the memory;
- obtaining transmission data to be transmitted to the external apparatus, which is the transmission sender of the selected received data; and transmitting the transmission data to the external apparatus, which is the transmission sender of the selected received data, from the communication apparatus that has received the selected received data among the one or more communication apparatuses based on the transmission/reception information stored in the memory.

13. An information processing apparatus comprising:
a storing unit to store data received by a communication apparatus from an external apparatus, and transmission/reception information including transmission sender information of the external apparatus indicating a transmission sender of the received data, and identification information of the communication apparatus used for receiving the received data, the communication apparatus being one or more communication apparatuses communicable with the external apparatus;
an identification unit to identify selected received data selectable by a user from the received data stored in the storing unit;
a transmission data obtaining unit to obtain transmission data to be transmitted to the external apparatus, which is the transmission sender of the selected received data identified by the identification unit; and
a transmission control unit to transmit the transmission data to the external apparatus, which is the transmission sender of the selected received data, from the communication apparatus that has received the selected received data among the one or more communication apparatuses based on the transmission/reception information stored in the storing unit.

14. The information processing apparatus of claim 13, further comprising:
an accumulation unit to accumulate transmission information including transmission sender information, which is information of the external apparatus transmitted with the transmission data, and identification information of a communication apparatus used for transmitting the transmission data among the one or more communication apparatuses; and
a designating unit to designate a communication apparatus to be used for transmitting data to the external apparatus among the one or more communication apparatuses based on the transmission information accumulated by the accumulation unit when receiving a transmission request of the transmission data, included in the transmission information to the external apparatus,
wherein the transmission control unit transmits the transmission data from the communication apparatus designated by the designating unit based on the transmission request.

15. The information processing apparatus of claim 13, wherein the transmission control unit includes an instruction unit that instructs transmission of the transmission data to the external apparatus to the communication apparatus that has received the selected received data when transmission of transmission data is requested by one of the communication apparatus.

16. The information processing apparatus of claim 13, further comprising a transmission recording unit to record information that the transmission data is transmitted to the external apparatus, which is the transmission sender of the selected received data.

17. A non-transitory computer-readable storage medium storing a program that, when executed by a computer having a processing circuit, causes the computer to execute the communication method of controlling communication of one or more communication apparatuses with an external apparatus of claim 12.

* * * * *